May 21, 1968 L. N. WILDER 3,384,718

TELEPHONE HANDSET HOUSING

Filed May 5, 1964 4 Sheets-Sheet 1

INVENTOR
L. N. WILDER
BY E. J. Olinder
ATTORNEY

May 21, 1968 L. N. WILDER 3,384,718

TELEPHONE HANDSET HOUSING

Filed May 5, 1964 4 Sheets-Sheet 2

May 21, 1968 L. N. WILDER 3,384,718

TELEPHONE HANDSET HOUSING

Filed May 5, 1964 4 Sheets-Sheet 3

May 21, 1968 L. N. WILDER 3,384,718

TELEPHONE HANDSET HOUSING

Filed May 5, 1964 4 Sheets-Sheet 4

United States Patent Office 3,384,718

Patented May 21, 1968

3,384,718
TELEPHONE HANDSET HOUSING

Leslie N. Wilder, New York, N.Y., assignor to Bell Telephone Laboratories, Incorporated, New York, N.Y., a corporation of New York Filed May 5, 1964, Ser. No. 364,974
11 Claims. (Cl. 179—100)

ABSTRACT OF THE DISCLOSURE

A telephone handset housing structure consists of two shells matably disposed along their respective rims with tongue-and-groove joints. Mating tabs and indentations along the rims overcome torsional flexure. A single access aperture is covered with a flush-mounted plate, depression of which actuates an auxiliary switchhook serially connected with the telephone base switchhook. Radial grooves in the base underside position the line cord in selective fashion.

This invention relates to telephone station apparatus and more particularly to telephone sets in which the dialing means and telephone circuitry are contained in the telephone handset. The general object of the invention is to improve the strength and operation of the telephone set.

In recent years, telephone subscriber sets which are compact, lightweight and versatile have gained considerable popularity. In one such telephone set the dial is located in a lightweight handset in a manner shown, for example, in Patent 3,073,911, issued to C. F. Mattke et al., on Jan. 15, 1963. This arrangement facilitates dialing because instead of having to dial at the relatively fixed telephone station base, the user can dial calls from any location to which the handset cord will reach. Also, the user can hold the handset and its dial in whatever position is most comfortable for purposes of dialing.

A dial-in handset telephone must incorporate the established receiver-to-transmitter geometrical relationship, which dictates a generally oblong shape. The handset must be easy to pick up either from its base or from a flat surface. It must fit snugly in its base and also be stable on a flat surface. It must be convenient and comfortable to use, yet resistant to tampering and rugged enough to withstand hard usage. It is desirable to construct the handset using two shells that can be easily molded and fastened together, yet are light in weight and constitute a rigid, squeakless structure when assembled. For esthetic and structural reasons, it is desirable for the mating interface to be convex or curved in the longitudinal or lengthwise direction.

Several complex and related problems that find no satisfactory solutions in prior telephone station art have heretofore precluded the making of a dial-in handset telephone that is both fully operational and structurally sound. For example, the dial finger wheel diameter must be large enough to accommodate the usual ten finger holes, yet must be as small as possible to keep the handset width to a minimum and thus promote ease of pick-up and a comfortable hand grip. This problem is partially alleviated by employing a reduced size dial such as taught in Patent 3,108,159, issued to C. F. Mattke, on Oct. 22, 1963. Yet even the reduced finger wheel diameter of the Spacesaver dial requires a handset width that is substantially greater than the handset depth. This condition aggravates the problem of torsional non-rigidity, which is a tendency of the two mating shells to slide on each other in a shear movement when torsional moment is applied to the handset. This tendency ultimately results in damage to the housing and its contents, and further produces a highly undesirable squeaking noise. An increase in the shell thickness which would be sufficient to provide the needed torsional rigidity would also bring an intolerable addition of bulk and weight to the handset.

Another problem involving the handset structure relates to the resistance of the handset to unauthorized intrusions. In order to discourage users from attempting to gain entry to the interior volume of the handset, as well as to keep foreign matter out, it is necessary to insure a tight, relatively impenetrable closure of the mating shells. Although gluing of the shells would achieve this, as well as lend a degree or torsional rigidity, it would thereafter be difficult to separate the shells for maintenance; and after each re-entry, regluing would be necessary. On the other hand, if the shells are not glued it is necessary to mate them mechanically in such a fashion that they stay together at all points on the mating interface and do not lend themselves to prying.

A further related problem, resulting from the tendency of plastic to vary dimensionally with age, is the likelihood that objectionable gaps or non-alignments at the mating interface of the shells will occur in time. Any such gaps would, of course, detract from the structural strength of the handset, and would constitute an access for foreign matter and a leverage point for prying instruments.

The problem of tampering is diminished if there are as few points of entry as possible to the interior volume. Ideally, no point of entry should appear as such to the user, and the fastening means employed to mechanically mate the two shells should be concealed. Yet quick and easy access to the interior volume of the handset must be possible for authorized persons such as installers and repairmen.

It is also desirable to provide a switchhook on the handset for a user to terminate a call and obtain dial tone for dialing a second call, and thus eliminate having to reach over to depress the switchhook mounted on the telephone base. Such a feature would be especially helpful to the bedridden, for example, but would be a convenience to all users. A switchhook protruding through an aperture in the handset and connected in series with the base-mounted switchhook could, of course, provide this feature. The aperture, however, would constitute an added point of entry; and the protruding switch or button would detract from the esthetic appeal of the handset.

A further problem relates to the single fixed position of the line cord with respect to the telephone base which, as in known prior telephone station art, represents an inconvenience for some persons, e.g., left-handed people. In the dial-in-handset telephone an additional drawback to this arrangement is that full benefit of being able to dial from any location to which the handset cord will reach cannot be achieved in all cases if the line cord is fixedly mounted to the base.

In the telephone set described herein to illustrate the invention, the dial is flush-mounted on the underside of the handset between the transmitter and the receiver. All the circuitry is contained in the handset, making it possible to use a four-conductor handset cord. The ringer, the switchhook and the handset support cradle are conveniently included in the telephone handset base. The handset consists of an outer shell and an inner shell, molded of a light, durable plastic such as an ABS plastic, which are mated to form a single integral unit. The telephone base is similarly constructed.

Accordingly, an object of the invention is to improve the reliability and ease of use of a dial-in handset telephone.

Another object of the invention is to increase the versatility of a dial-in handset telephone.

A further object of the invention is to achieve a high order of torsional rigidity in the handset without adding any weight or bulk.

A still further object of the invention is to discourage tampering and unauthorized entry of the handset, while simplifying legitimate entry for maintenance.

A still further object of the invention is to prevent dust, water and other foreign matter from entering the handset.

These and other objects are achieved in accordance with the principles of the invention by employing in a dial-in-handset telephone interlocked tongue and groove mating in conjunction with concealed elastic attachment of handset halves which have mating interfaces molded to different radii; by employing a single access aperture concealed by a depressible cover plate that actuates a concealed switchhook; and by providing means to position selectively the line cord with respect to the handset base to insure the greatest possible dialing flexibility for given line and handset cord lengths.

It is a feature of the invention that the handset shells come together in a tongue and groove joining at their mating interface to seal the interior volume from foreign substances and to conceal the mating interface so that the shells cannot be pried apart. Cooperating with the tongue and groove joining, a series of spaced tabs and corresponding spaced indentations along the mating interface provide a keying feature which, in accordance with the invention, accurately align the two shells upon mating and tightly interlock them to prevent any shearing movement between the shells when torsion is applied to the handset. A tight end closure between the shells to prevent any gaps from occurring with age is ensured by molding the inner shell's longitudinal or lengthwise face to a slightly greater radius than that of the outer shell. Moreover, the two shells are mechanically fastened together in an elastic attachment that maintains a tension between the shells to provide greater strength and security against prying, and also to counteract the effect of dimensional changes due to aging of the plastic. These elastic fastening means are located entirely inside the handset.

A particular aspect of the invention resides in a dual-purpose single access means to the handset. A single access aperture is concealed by a plate that fills the aperture opening and is normally substantially flush with the surface adjacent the opening. In accordance with the principles of the invention, the access cover plate performs a dual function. A switchhook is located directly beneath the cover plate and is responsive to the depressing of the cover plate; hence, the plate not only conceals the access aperture but also actuates the switchhook. Accordingly, only one access aperture need be employed on the entire handset and yet the highly desirable recall mechanism can still be provided, enabling a user to terminate a first call and to acquire dial tone for a second call without having to reach to the telephone base switchhook.

Additionally, means are provided to reduce the incidence of un-intended or accidental operation of the recall mechanism. When depressed, the cover plate travels initially against a light preload spring before actuating the recall switch plunger at which point it is opposed by a second, much heavier spring.

Further, a multiplicity of guide channels are molded in the underside of the base to enable the line cord to be led from substantially any point on the periphery of the base. This point can be so selected, if desired, that when the line cord is fully stretched, the base outlet for the handset cord is as close as possible to the user. The distance which a given length of handset cord will reach is therefore increased. Consequently, for a user who needs to operate the handset-mounted switchhook at locations remote from the line cord, the feature of selective positioning of the line cord on the base can increase the number of such remote locations and thereby enhance the utility of the switchhook. Further, with the line cord selectively positionable with respect to the base periphery, the base can be put at any location on a desk top that is convenient to the user.

Accordingly, one feature of the invention relates to the tongue and groove joining of the two handset shells around the entire circumference of their mating interface.

Another feature of the invention resides in a series of spaced tabs along the mating edge of one shell for interlocking with corresponding spaced indentations along the mating edge of the other shell.

A further feature of the invention is that the inner shell's longitudinal mating edge is molded to a relatively greater radius than the outer shell's longitudinal mating edge.

A still further feature of the invention is that the two shells are drawn together in an elastic attachment to insure a permanent tight fit at all points on the mating interface, particularly the handset ends.

A still further feature of the invention pertains to the single access aperture for gaining entry to the inner portion of the handset, the aperture being concealed by a cover plate which when depressed activates a recall mechanism.

A still further feature of the invention pertains to the selective positioning of the line cord with respect to the underside of the base.

These and other objects and features will be fully comprehended from the following detailed description of an illustrative embodiment of the invention and from the appended drawing in which.

Figure 1:
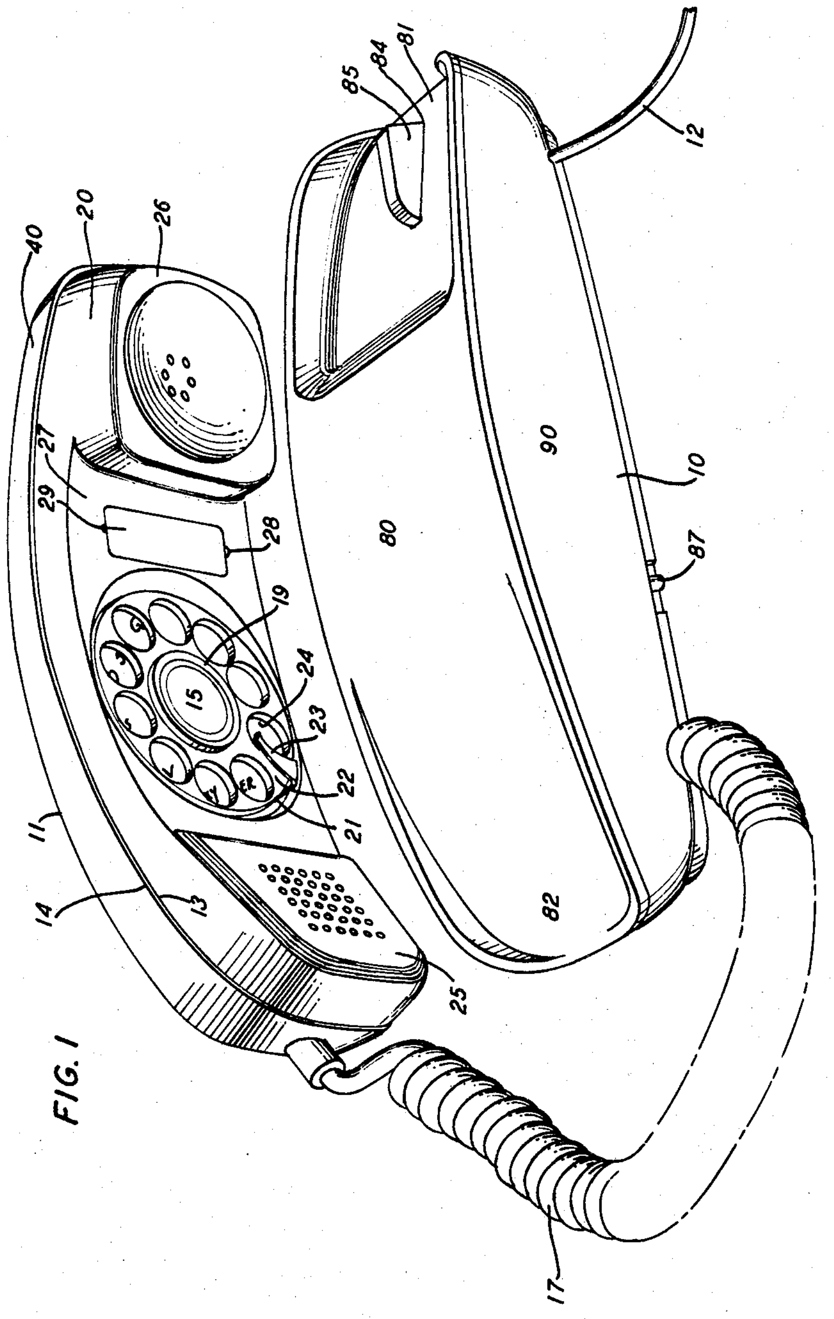
FIG. 1 is a perspective view of the handset and its base.

Referring to FIG. 1, the dial-in handset telephone consists essentially of a base 10 connected to the dial-in handset 11 by a handset cord 17. The dial-in handset housing consists of a front shell 20 and a back shell 40 mateably disposed to each other along their respective rims 13 and 14. Front shell 20 includes transmitter cap 25, receiver cap 26 and receiver shelf 27. Dial 21 is located between receiver shelf 27 and transmitter cap 25 and includes a finger wheel 22, a finger stop 23, a number plate 24 and a finger wheel retaining hub 15. Further details concerning a dial that is suitable for the handset may be obtained by referring to Patent 3,105,122, issued to J. G. Babb et al. on Sept. 24, 1963. Receiver shelf 27 contains access aperture 28, concealed by cover plate 29, which is of the same material and color as the surrounding shelf 27. An access area 55 (shown in FIG. 6) is located beneath cover plate 29 and will be discussed in a succeeding paragraph.

Figure 2:
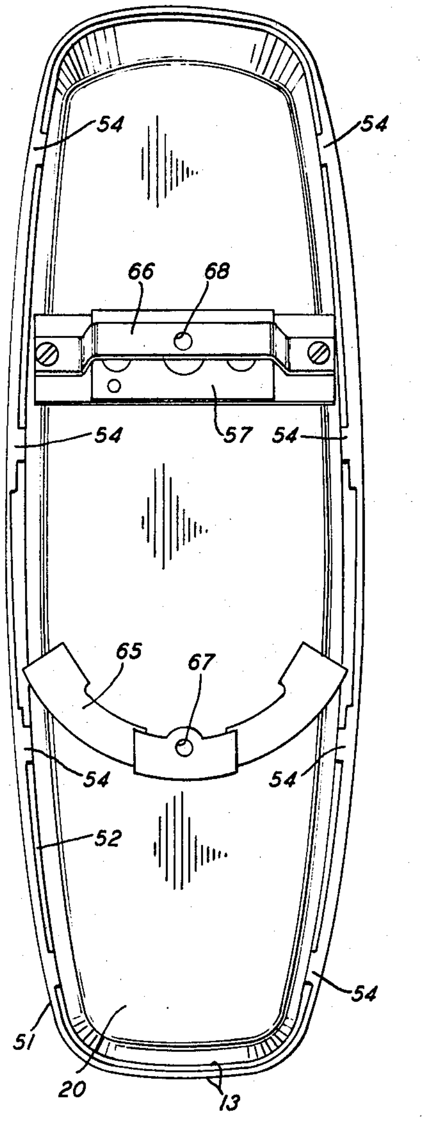
FIG. 2 is a plan view of the front shell showing the mating edges and the fastening means.
Figure 3:
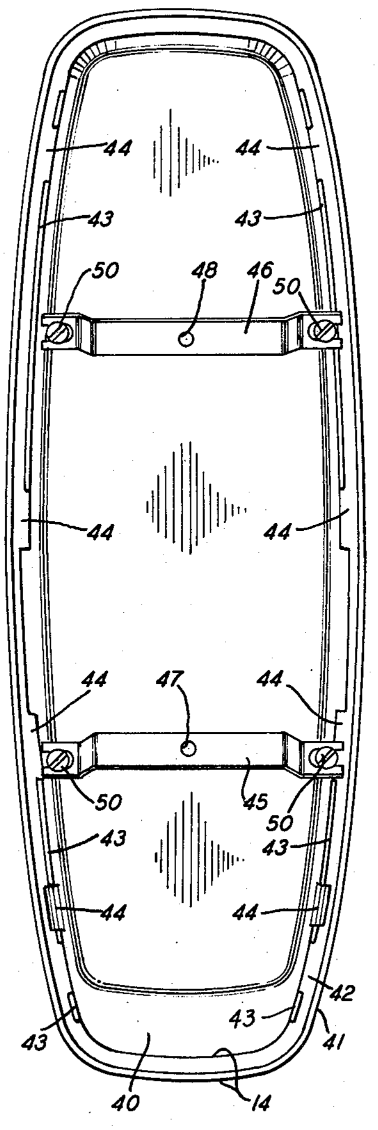
FIG. 3 is a plan view of the back shell showing the mating edges and the fastening means.
Figures 4, 5, 5A, 6, 7:
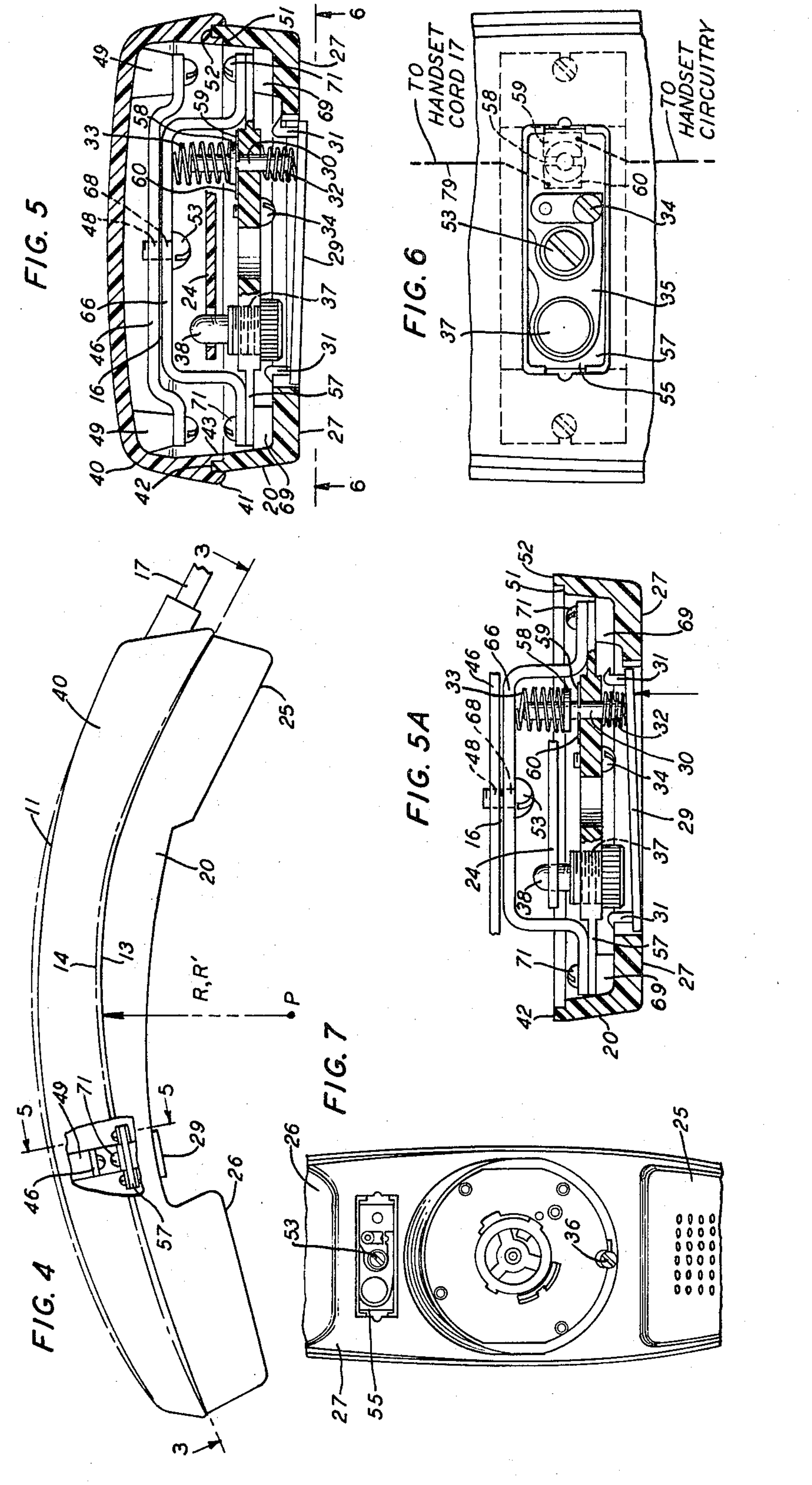
FIG. 4 is an elevation view of the handset showing the mating of the two shells of the handset and the molding of the two shells to different radii.
FIG. 5 is a cross-sectional view of the assembled handset taken along line 5—5 of FIG. 4, and showing tongue and groove mating, concealed fastening means, dual purpose cover plate and recall mechanism in the unoperated position.
FIG. 5A is a cross-sectional view similar to FIG. 5, but showing the recall mechanism in the operated position.
FIG. 6 is a plan view of the access aperture of the front shell.
FIG. 7 is a plan view of the mid-portion of the front shell with the access area cover plate and portions of the dial removed to reveal the fastening screws.

FIGS. 2 and 3 are taken along line 3—3 of FIG. 4; and show the rims 13 and 14 of front shell 20 and back shell 40, respectively. In FIG. 2, rim 13 of front shell 20 consists of an outer ridge 51 and a groove 52 which run around the periphery of rim 13. In FIG. 3, rim 14 of back shell 40 consists of an outer ridge 41, a groove 42 and an inner ridge 43 which run around the periphery of rim 14. Back shell 40 is mated with front shell 20 by fitting outer ridge 51 of front shell 20 into groove 42 of back shell 40. Outer ridge 51 is thus straddled by outer ridge 41 and inner ridge 43 of back shell 40, providing continuous tongue and groove mating of the two shells. This is shown cross-sectionally in FIG. 5. Since outer ridge 41 extends out from front shell 20, it also provides a desirable structure to grasp so that the handset may be held securely.

Referring again to FIGS. 2 and 3, rim 14 of back shell 40 includes a plurality of spaced indentations 44. Rim 13 of front shell 20 includes a plurality of spaced tabs 54, each corresponding to a respective one of said spaced indentations 44 of back shell 40. When back shell 40 is mated to front shell 20 the spaced tabs 54 fit into the corresponding spaced indentations 44 of back shell 40. These tabs and indentations interlock the two shells and prevent any sliding movement of one rim on the other. This interlocking or keying feature results in a handset that is approximately thirty times more resistant to torsional forces than the same handset would be without such feature. With this feature, the handset is as torsionally rigid as it would be if the shells were permanently bonded together.

In FIG. 4 the lengthwise portion of rim 14 of back shell 40 is shown by a dotted line to illustrate how shells 20 and 40 line up before being drawn together by the fastening means. As seen, the lengthwise mating face of the front shell 20 is convex, being molded to some convenient radius R. Similarly, the lengthwise mating face of back shell 40 is concave and is molded to a radius R' which is slightly less than radius R. The end portions come together first and close firmly when the fastening means are drawn together. When this occurs, $R'=R$ and the radii have a common center point shown at P in FIG. 4. The mid-portion of the mating rims 13 and 14 also touch, but with lesser force than that occurring at the ends. This results from the front shell's lengthwise mating face being molded to a slightly greater radius than the back shell's lengthwise mating face.

Referring now to FIG. 5, cover plate 29 includes two cover plate snaps 31, which secure cover plate 29 to the inner surface of front shell 20. Cover plate 29 may be removed when necessary with the aid of a stiff, thin wire. Cover plate 29 conceals an access area 55 (best shown in FIG. 6). A printed circuit board 57 is mounted and secured to front shell 20 by two machine screws 71. Circuit board 57 contains a bridging screw 34 and a strap 35 for automatic number identification connection, dial lamp socket 37 and dial lamp 38. Upper fastening screw 53 which is ordinarily concealed beneath number plate 24 is in view when cover plate 29 and number plate 24 are removed, as shown in FIG. 6.

Circuit board 57 also serves as a guide for switchhook plunger 30 which is actuated by a sufficient depressing of cover plate 29. A metal strip 58 is fixedly mounted on plunger 30 and normally bridges contacts 59 and 60, as shown in FIG. 5. Surrounding plunger 30 at its exposed end is preload spring 32, which seats on circuit board 57 and places a light spring force on cover plate 29 in its normal position.

As shown in FIG. 6, contact 59 is wired to the circuitry that is contained in the handset (not shown); and contact 60 is connected through a conductor 79 of handset cord 17 in series with the base-mounted switchhook (not shown). When cover plate 29 is pressed, after an initial travel against preload spring 32, plate 29 reaches plunger 30 and forces strip 58 away from contacts 59 and 60. This breaks one side of the line as shown in FIG. 5A and provides a convenient handset-mounted momentary hang-up or recall feature.

Once cover plate 29 has reached plunger 30 a much heavier spring 33, which seats on strip 58 and loads plunger 30, comes into play opposing the further depression of cover plate 29. Thus, preload spring 32 and plunger main spring 33 together provide a desirable non-uniform force opposing the depressing of cover plate 29. If a user, in the midst of a call, should inadvertently begin to depress cover plate 29 the initial travel of cover plate 29 would alert him to its presence and tend to deter him from further depressing of plate 29, even if he did not know of the recall feature. Yet this amount of initial travel against preload spring 32 would usually not be sufficient to actuate plunger 30 and the recall mechanism; and therefore the user's call would remain set up.

As shown in FIG. 5, one possible normal position of cover plate 29 is to have one end flush with receiver shelf 27 and to allow the other end to project slightly above receiver shelf 27 to provide a distinct surface or button to depress. Of course, either end of cover plate 29 could be designed to project above the receiver shelf 27; or cover plate 29 could remain flush at both ends or flush at either or both ends. Further, the design could be modified to locate plunger 30 at some other position on circuit board 57.

Returning again to FIGS. 2 and 3, the elastic fastening of the two shells is best illustrated therein. Back shell 40 includes a lower metal strip 45 and an upper metal strip 46 which are mounted on bosses 49 by screws 50. The bosses 49 are located so as to divide the back shell 40 approximately into thirds. Metal strips 45 and 46 are generally U-shaped and include, respectively, tapped holes 47 and 48 at their mid-portion. Front shell 20 includes a lower plastic shelf 65 and also an upper metal strip 66 mounted on bosses 69 by screws 70. Two of the bosses 49, and 69 are best illustrated in FIG. 5. These are also generally U-shaped and include drilled holes 67 and 68, respectively, at their mid-portions. Lower plastic shelf 65 corresponds to and aligns with lower metal strip 45 of back shell 40 while upper metal strip 66 corresponds to and aligns with upper metal strip 46 of back shell 40. As shown in FIG. 5, when back shell 40 is mated with front shell 20 a gap 16 remains between metal strips 46 and 66. Therefore when upper fastening screw 53 is inserted through drill hole 68 and threaded to tapped hole 48, the gap closes and an elastic fastening results. In similar fashion, a gap (not shown) remains between metal strip 45 and plastic shelf 65 upon the mating of the shells. Lower fastening screw 36 (shown in FIG. 7) is inserted in drilled hole 67 and screwed into tapped hole 47, resulting in an elastic fastening.

It is readily apparent that the metal strips 45, 46, and 66 may be secured to their respective shells by a snap-in design, which would eliminate the need for screws.

Upper fastening screw 53 and lower fastening screw 36 are normally hidden under number plate 24 which must be removed before either can be reached. Referring back to FIG. 1, in order to remove number plate 24, finger wheel retaining hub 15, finger wheel 22 and a plate retaining ring (not shown) are removed in a routine manner shown for example, in Patent 3,108,159 cited above. In addition, cover plate 29 must be removed in a manner described above to obtain access to upper fastening screw 53. This concealment of the shell fastening means further deters tampering and unauthorized entry. The internal parts of the handset all of which are mounted within the interior of front shell 20 are afforded protection in this manner. When back shell 40 is removed, the entire circuit (not shown) readily may be inspected or repaired. Although dial 21 is removed from the front, its mounting screws (not shown) are exposed only with the back shell removed.

The characters are engraved on number plate 24 in a well-known manner that conducts light received from dial lamp 38 through a clear acrylic number plate 24 upwardly toward the user. A switch operating in response to switch-hook plunger 85 of base 10 provides current to dial lamp 38 so that the characters on number plate 24 are illuminated whenever the handset is off-hook. Dial lamp 38 may also be energized from a switch 86 mounted through the underside of base lower member 90, shown in FIG. 8. The dial light is reflected off the base in an attractive and diffuse manner, providing a night light which may be employed with the handset on-hook.

When not in use, the handset seats in base 10 as can be seen by reference to FIG. 1. Like the handest itself, the base 10 consists of an upper member 80 and a lower member 90 joined at their respective rims. Tongue and groove interlocking, a series of spaced tabs and corresponding spaced indentations along the rims, and elastic fastening means—all of which have been described above in connection with the structure of handset 11—may also be advantageously employed in the construction of base 10. Base 10 houses a ringer, a switchhook mechanism and circuitry, and a steel chassis for mounting these items. Upper member 80 of base 10 is longitudinally convex to accommodate the shape of handset 11. Upper member 80 includes a first end portion 81 which is recessed to accommodate receiver cap 26 of handset 11. Protruding into the recess of end portion 81 through an aperture 84 is switchhook plunger 85. Switchhook plunger 85 is associated with the switchhook mechanism (not shown) and protrudes high enough so that it will be operated by receiver cap 26 or transmitter cap 25 when the handset 11 is replaced in base 10. Upper member 80 further includes a second recessed end portion 82 which accommodates transmitter cap 25 of handset 11.

An alternative arrangement for connecting and disconnecting the handset to the line would be to eliminate the base mounted switchhook altogether and substitute a rigid protuberance that would impinge upon and actuate cover plate 29 when the handset 11 is replaced in the base 10. The only switchhook necessary in such an arrangement would be that mounted in the handset itself.

Figure 8:
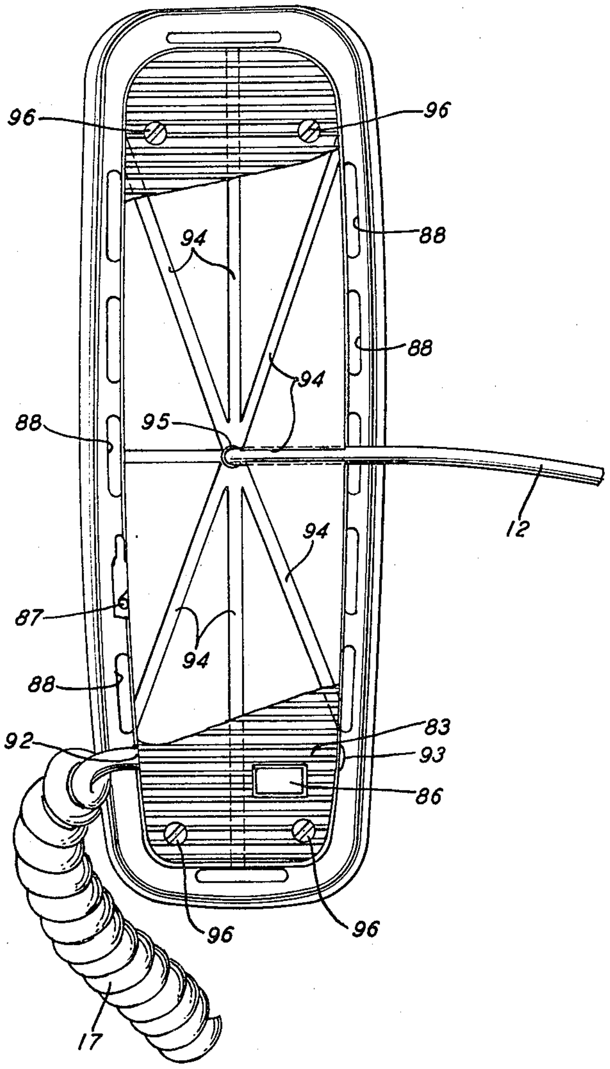
FIG. 8 is a plan view of the handset base showing the channels for selective positioning of the line cord, the night light switch and sound ports.

Although the dial-in handset concept eliminates the need for base stability during dialing, the base nevertheless should be resistant to sliding under the tension developed when the handset cord is stretched. Accordingly, as shown in FIG. 8, a non-slip base pad 83 may be fastened to the underside of lower member 90 of base 10. In addition, a weighting pad may be included in bottom lower member 90 and base pad 83 to add additional weight to base 10.

FIG. 1 suggests one advantageous arrangement of leading handset cord 17 and line cord 12 into base 10 through suitable apertures in base lower member 90. This arrangement is usually convenient to most users. However, many other users might prefer to have base 10 and handset 11 in some position that would require a different arrangement of cords. FIG. 8 illustrates a means for achieving greater freedom in positioning the telephone on a desk and for enabling the handset-mounted switchhook to be operated at a greater number of remote locations. The bottom portion of base lower member 90 is shown without base pad 83 in place. Handset cord 17 may be passed through either a first entrance aperture 92 or a second entrance aperture 93 which are located beneath second end portion 82 of base 10. Line cord 12 leads from base 10 through a central aperture 95. A plurality of channels 94 molded in the bottom of base lower member 90 lead radially from central aperture 95 to various points along the periphery of base lower member 90. These channels 94 are substantially C-shaped in cross section with their opening width being less than the diameter of line cord 12. Line cord 12 may be snap-mounted along any one of channels 94 in accordance with the convenience requirements of the user. With line cord 12 and handset cord 17 in place the base pad 83 is fastened to base lower member 90 with screws 96, providing further retention for line cord 12 and handset cord 17.

A variation on this concept is to mold some nonskid material directly on to the underside of base lower member 90 and then mold the channels 94 thereon also. With this arrangement, any user could readily selectively position line cord 12 without first having to remove other members such as base pads.

FIG. 8 also shows a ringer volume control 87 mounted along the bottom edge of lower member 90. A series of sound ports 88 are shown around the perimeter of lower member 90 which transmit the ringing sound. With base 10 in its normal upright position sound ports 88 are not visible to the user.

The particular embodiment described herein is merely illustrative of the principles of the invention. It will be apparent to persons skilled in the art that a wide variety of implementing means may be employed without departing from the spirit and scope of the invention.

What is claimed is:

1. In a telephone set of the type having dialing means mounted in the handset and having a handset base with a switchhook and a line cord, the improvements comprising, in combination, a back shell and a front shell mateably disposed to one another along their respective rims, thereby defining an interior volume of said handset, switchhook means mounted within said interior volume, means for serially connecting said switchhook means to said switchhook in said base, a single access aperture through said front shell to said interior volume, and moveable means billing said access aperture and having a top surface that is normally substantially flush with the surface of said front shell adjacent said aperture, said moveable means cooperating with said switchhook means whereby a sufficient movement of said moveable means actuates said switchhook means.

2. Apparatus in accordance with claim 1 wherein said moveable means comprises a depressible cover plate and first resilient means applying a restoring force opposing the depressing of said cover plate.

3. Apparatus in accordance with claim 2 wherein said switchhook means includes a plunger located beneath said cover plate and having a normal and an operated position and further having one end thereof in spaced relation to said cover plate when in said normal position, second resilient means applying a restoring force to said plunger urging it into said normal position, and contacting means responsive to movement of said plunger to said operated position for breaking contact with said switchhook on said handset base and further responsive to the return of said plunger to said normal position for making contact with said switchhook on said handset base.

4. Apparatus in accordance with claim 3 wherein said second resilient means produces a substantially greater restoring force than said first resilient means, whereby the depressing of said cover plate is opposed initially by a relatively weak restoring force until said cover plate contacts said plunger in its said normal position, whereupon further depressing of said cover plate is opposed by a relatively strong restoring force.

5. Apparatus in accordance with claim 4 wherein said contacting means comprises a conductive strip fixedly mounted on said plunger and two contacts connected with said switchhook on said handset base, said strips connecting said two contacts when said plunger is in said normal position and disconnecting said two contacts when said plunger is in said operated position.

6. A telephone handset of the type having dialing means mounted therein comprising, in combination, a front shell and a back shell mateably disposed to one another along their respective rims, wherein the rim of said front shell and the rim of said back shell each include a lengthwise portion, and the lengthwise portion of said first shell rim is convex while the lengthwise portion of said back shell rim is concave, the convexity being of a relatively greater radius than the concavity, whereby in mating the end portions of said front and back shells contact with relatively greater force than the midportions thereof, thereby to insure lasting closure of said shells at said end portions.

7. Apparatus in accordance with claim 6 wherein said front shell and said back shell each include at least two spaced flexible strips mounted widthwise across the inside space of the respective shells, each of said strips mounted on said front shell being in juxtaposition to a corresponding one of said strips mounted on said back shell upon full mating of said shells, thereby forming pairs of opposed strips, the strips in each of said pairs being separated by a gap when said shells are fully mated, and means for drawing the strips in each of said pairs together across said gap, whereby a tension is created across each said pair thereby drawing said front shell tightly against said back shell to insure a relatively impenetrable closure of the two shells and to guard against the occurrence of gaps at the mating interface.

8. Apparatus in accordance with claim 7 wherein said rim of said back shell comprises a first ridge, a first groove and a second ridge, and said rim of said front shell comprises a third ridge and a second groove, whereby said third ridge of said front shell fits into said first groove of said back shell and said second ridge of said back shell fits into said second groove of said front shell.

9. Apparatus in accordance with claim 8 wherein said rim of said back shell includes a plurality of spaced tabs, and said rim of said front shell includes a plurality of spaced indentations, each of said spaced tabs fitting into a corresponding number of said spaced indentations, thereby to resist translational and sliding motion of said rims with respect to one another and to give torsional rigidity to said handset.

10. In a telephone set of the type having dialing means and switchhook means mounted in the handset and a separate base having an underside and connected to said handset by a handset cord and connected to terminal means by a line cord, means for selective positioning of said line cord with respect to said base comprising a central aperture in said underside feeding said line cord out of said base, and a plurality of spaced channels leading radially from said central aperture to the periphery of said underside of said base, the entrances of each of said spaced channels being of slightly lesser width than the diameter of said line cord, whereby said line cord may be snap-positioned in any one of said spaced channels, thereby to lead said line cord from said base to a point on the periphery of said base that is most convenient to the user.

11. A telephone handset comprising, in combination, a back shell and a front shell mateably disposed to one another along their respective rims thereby defining an interior volume of said handset, said front shell having a mouthpiece area and an earpiece area at opposite ends thereof, dialing means mounted within said interior volume and accessible from a portion of said handset intermediate said mouthpiece and earpiece areas, means for joining of said shells comprising a first ridge, a first groove and a second ridge along the rim of said back shell, and a third ridge and a second groove along the rim of said front shell, said third ridge mating with said first groove and said first ridge serving also as a gripping edge, thereby to facilitate holding of said handset during dialing of said dialnig means, the lengthwise potrion of said front shell joining means being convex and the lengthwise portion of said back shell joining means being concave, the convexity being of a relatively greater radius than the concavity, and means for drawing together said back shell and said front shell, whereby the end portions of said shells contact with relatively greater force than the midportions thereof, thereby to achieve rigid closure of said joining means.

References Cited

UNITED STATES PATENTS

| | | | |
|---|---|---|---|
| 2,868,888 | 1/1959 | Bender | 179—100 |
| 398,610 | 2/1889 | Hall | 109—74 |
| 2,452,830 | 11/1948 | Braun | 179—167 |
| 2,916,563 | 12/1959 | Bernstein | 179—167 |
| 3,073,911 | 1/1963 | Mattke et al. | 179—159 |
| 3,123,676 | 3/1964 | Prescott et al. | 179—90.3 |
| 3,303,290 | 2/1967 | Suloway | 179—90.3 |

KATHLEEN H. CLAFFY, *Primary Examiner.*

A. H. GESS, *Assistant Examiner.*